United States Patent [19]
Engel

[11] 3,886,984
[45] June 3, 1975

[54] TREE HARVESTER SHEAR ASSEMBLY WITH FIXED AND MOVABLE BLADES

[75] Inventor: Henry L. Engel, New Lenox, Ill.

[73] Assignee: Caterpillar Tractor Co., Peoria, Ill.

[22] Filed: June 3, 1974

[21] Appl. No.: 475,848

[52] U.S. Cl. ............... 144/3 D; 144/2 Z; 144/34 D; 144/309 AC
[51] Int. Cl. ............................................. B27c 9/00
[58] Field of Search ........ 144/2 Z, 3 D, 34 R, 34 E, 144/309 AC

[56] References Cited
UNITED STATES PATENTS
| | | | |
|---|---|---|---|
| 3,568,742 | 3/1971 | Frankenberg | 144/34 E |
| 3,797,539 | 3/1974 | Moser | 144/3 D |
| 3,842,872 | 10/1974 | Moser | 144/3 D |

Primary Examiner—Andrew R. Juhasz
Assistant Examiner—W. D. Bray
Attorney, Agent, or Firm—Phillips, Moore, Weissenberger, Lempio & Strabala

[57] ABSTRACT

A tree harvester including a mechanism for gripping and axially moving a tree relative to a shear assembly and a delimbing assembly, the shear assembly having a movable blade pivoted to the shear frame in spaced-apart relation from a fixed jaw, a fixed blade being formed along the jaw and an intermediate frame portion in opposed relation to the movable blade with guide rails arranged along the fixed blade to limit its penetration into the tree and facilitate movement of a severed tree relative to the fixed blade.

11 Claims, 3 Drawing Figures

3,886,984

TREE HARVESTER SHEAR ASSEMBLY WITH FIXED AND MOVABLE BLADES

BACKGROUND OF THE INVENTION

Portions of the present tree harvester, the specific construction of which is not part of the present invention, are described in greater detail in U.S. Pat. No. 3,669,161 issued June 13, 1972 and U.S. Pat. No. 3,717,185 issued Feb. 20, 1973, both of these patents being assigned to the assignee of the present invention.

A shear assembly contemplated for use in combination with a tree harvester disclosed by the above patents is described in U.S. Pat. No. 3,731,720 issued May 8, 1973 and also assigned to the assignee of the present invention.

The present invention relates to a shear assembly for mounting on a tree harvester to harvest or cut standing trees. The shear assembly may be employed alone in such an arrangement or in combination with other implements for further processing the tree after it is cut. As described below and shown in the accompanying drawings, the shear assembly is preferably combined with a delimbing assembly and a drive mechanism for gripping the tree and moving it relative to the delimber and shear assembly.

The shear assembly of the present invention is particularly intended to minimize damage to the base of the tree trunk where it is severed from the ground. Trees of a size which may be readily cut by the present shear assembly have in the past been predomantly used for pulp. However, there is a growing tendency to remove as much cut lumber as possible from such trees with only the remaining portions of the tree being used for pulp production. Accordingly, it is important that the base of the tree trunk be severed with minimum fiber damage in order to provide the maximum production of cut lumber from the trees.

SUMMARY OF THE INVENTION

It is therefor an object of the present invention to provide a shear assembly suitable for achieving the objectives described above.

In particular, the present invention contemplates a shear assembly having a movable blade pivoted to a shear frame in spaced apart relation from a fixed jaw with a fixed blade extending along the fixed jaw and an intermediate frame portion in facing relation to the movable blade. The purpose of the fixed blade is to cut or penetrate to a limited degree into the tree while a substantial portion of the tree is severed by the movable blade. This combination has been found to minimize damage to the base of the cut tree.

It is a further object of the invention to provide such an arrangement of a movable blade and a fixed blade with guide means being disposed along the fixed blade to limit its penetration into the tree and facilitate subsequent movement of the severed tree relative to the fixed blade.

Additional objects and advantages of the present invention are made apparent in the following description having reference to the accompanying drawings.

DESCRIPTION OF THE PREFERRED EMBODIMENT

Figure 1:
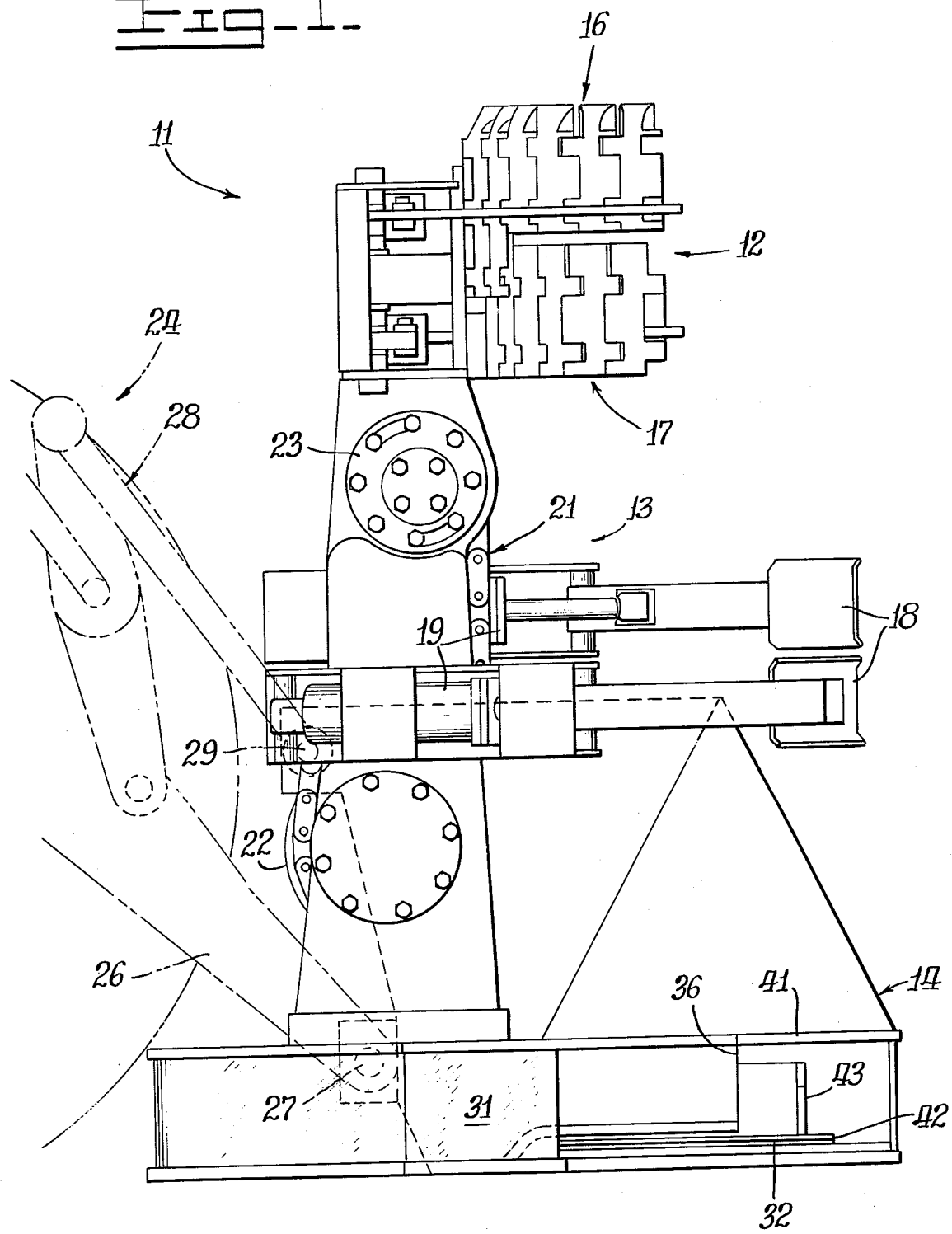
FIG. 1 is a side elevation view of a tree harvester unit mounted upon a vehicle and including a shear assembly constructed according to the present invention.

Referring particularly to FIG. 1, a preferred embodiment of a tree harvester unit constructed according to the present invention is indicated at 11 and includes a delimbing assembly 12, a drive mechanism 13 and a shear assembly indicated at 14. The drive mechanism and the delimbing assembly are described in greater detail by the two reference patents noted above.

For purposes of the present invention, it is sufficient to note that the delimbing assembly 12 preferably includes a pair of flexible blades 16 and 17 which are sharpened along one edge and may be closed about the circumference of a tree for removing limbs from the tree as it is shifted axially therethrough.

The drive mechanism 13 includes a pair of gripping arms or grapples 18 which may be moved in opposition to each other by means of hydraulic jacks 19 in order to firmly secure a tree against a drive means 21. The drive means is preferably an endless track or chain assembly arranged for rotation upon the harvester apparatus by means of rollers and sprockets, one of which is partially shown at 22.

In the preferred embodiment of the present invention, the delimbing assembly 12, the drive mechanism 13 and the shear assembly 14 are all supported upon a common main frame structure 23 mounted upon a vehicle partially shown in phantom at 24. The vehicle is of a type having conventional lift arms, one of which is indicated at 26, with the main frame being secured to the lift arms 26 by means of horizontally arranged pivots such as that indicated at 27. A conventional tilt linkage 28 on the vehicle is also pivotally conneccted to the frame 23 at a location 29 above the pivot axis 27. The tilt linkage is thus effective to pivot the frame 23 and particularly the shear assembly between a generally horizontal position suitable for severing a standing tree and a generally vertical position wherein the tree is suspended for processing by the delimbing assembly and/or the shear assembly.

In operation, the tree harvester apparatus is positioned by the vehicle to receive a standing tree within the shear assembly, the grapples and the delimbing assembly. The grapples 18 are moved by the jacks 19 to secure the tree against the drive track 21. The flexible blades of the delimbing assembly are also closed into engagement with the circumference of the tree.

The tree is severed by the shear assembly after which the top of the tree harvester unit is rotated forwardly and downwardly by the tilt linkage 28 so that the tree is generally in a horizontal position. The tree is then shifted axially through the delimbing assembly and toward the shear assembly by the drive track 21 with limbs being removed from the tree by the delimbing blades. During this mode of operation, the shear assembly may be intermittently operated to also cut the delimbed tree into appropriate lengths or sections.

Figure 2:
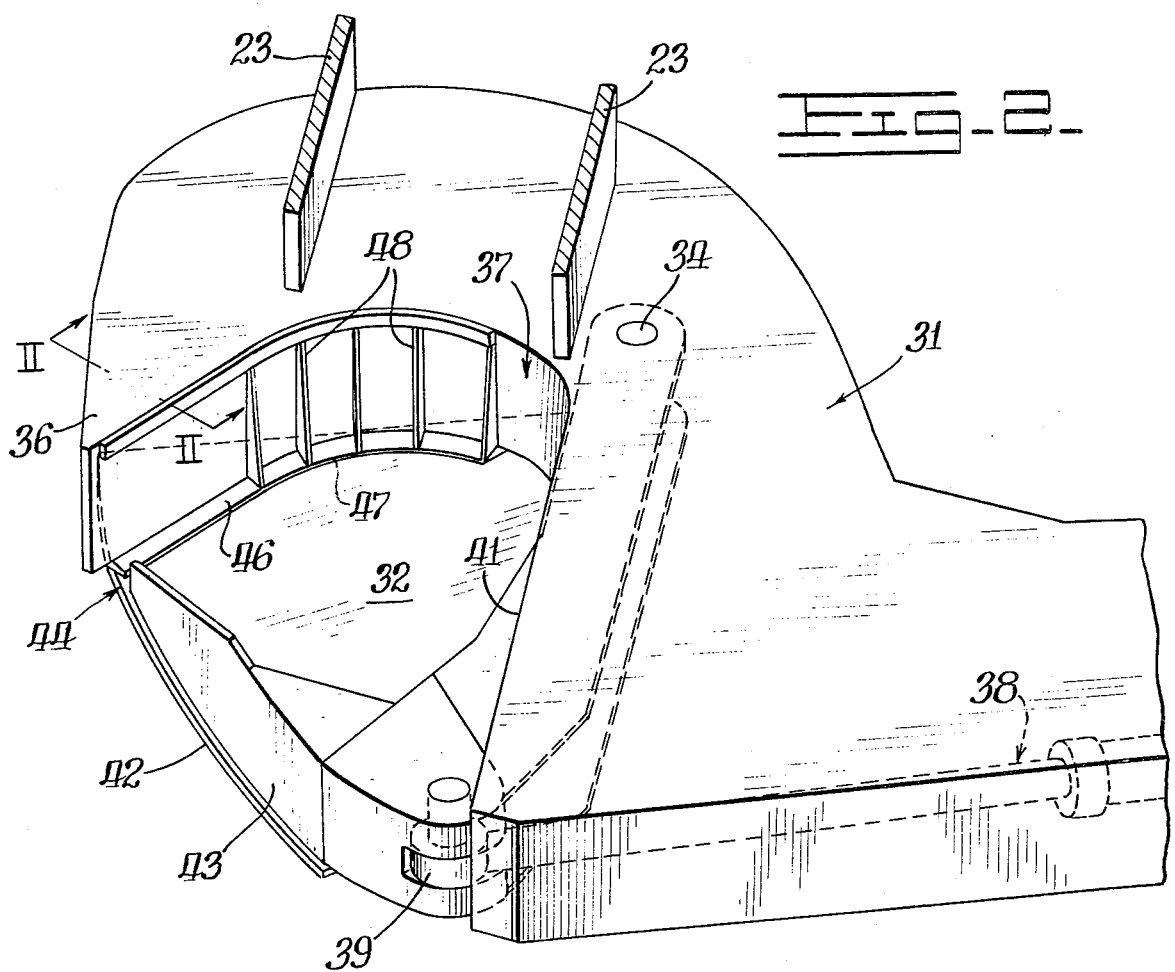
FIG. 2 is a fragmentary prospective view of a portion of the shear assembly.
Figure 3:
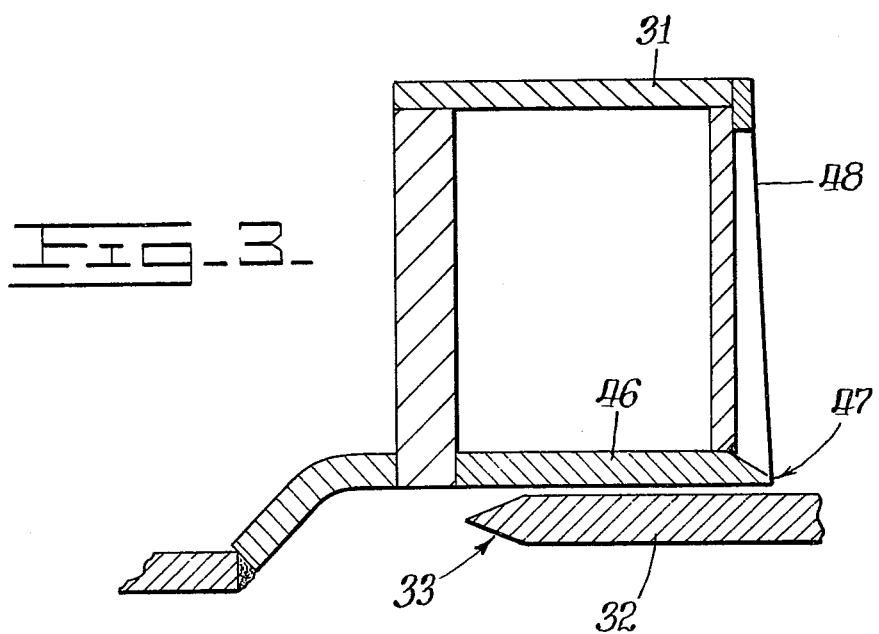
FIG. 3 is a view taken along section line II—II of FIG. 1.

Constrcution features of the shear assembly 14 are better illustrated in FIGS. 2 and 3. The shear assembly 14 includes a shear frame 31 in fabricated box construction in order to enclose various portions of the shear assembly and to provide rigid support for other portions of the shear assembly. A portion of the main frame 23 is also illustrated in FIG. 2 to show its relation to the shear frame 31.

The shear assembly includes a movable blade 32 having a cutting edge 33 (See FIG. 2 in particular). The blade is pivotally connected to a rearward portion of the shear frame 31 as indicated at 34. The shear frame 31 also provides a forwardly extending, fixed jaw 36 in opposed relation to the blade 32. The jaw 36 is spaced apart from the pivot connection 34 by means of an intermediate frame portion generally indicated at 37.

The blade 32 is operated by a hydraulic jack which is indicated at 38 and has a pivot connection with the blade at 39. When the blade 32 is retracted by the jack 38 into a position where its cutting edge 33 is in approximate alignment with an edge 41 of the shear frame 31, the movable blade together with the jaw 36 and the intermediate frame portion 37 form an opening for receiving a standing tree. During shearing operation, the movable blade 32 is then driven by the jack 38 so that its cutting edge 33 moves directly toward the jaw 36 and/or intermediate frame portion 37 to secure the tree while it is being cut.

It may be seen from FIG. 2 that an edge surface 42 of the blade opposite its pivot connection 34 is curved or arcuate. A small vertical plate 43 is secured to the blade along the arcuate surface 42 for a variety of purposes. Initially, the plate 43 increases rigidity of the blade 32 while also serving to retain the base of a severed tree within the area formed by the jaw 36, the intermediate frame portion 37 and the frame surface 41. The vertical plate 43 also has a cutting edge 44 in order to sever outwardly projecting portions of a standing tree, particularly roots where the tree is cut close to the ground.

In order to minimize damage to the base of the severed tree, the present invention particularly contemplates a fixed blade 46 having an arcuate cutting edge 47 extending along the jaw 36 and intermediate frame portion 37 in opposed relation to the cutting edge 33 of the blade 32. The fixed blade 46 is slightly offset from the plane of the blade 32 so its cutting edge passes beneath the fixed blade 46 as may be best seen in FIG. 3.

Once the tree is severed by actuation of the shear assembly, it is necessary to remove the tree from the shear assembly. Preferably, it is contemplated to shift the severed tree through a delimbing unit or other processing unit as described in greater detail above. In order to facilitate subsequent movement of the tree, a plurality of guide rails 48 are arranged in spaced apart relation along the arcuate fixed blade 46 while extending upwardly in order to engage the base of the tree both before and after it is severed by the shear blade 32. The guide rails 48 facilitate subsequent movement of the tree by limiting cutting penetration of the fixed blade 46 and also by their subsequent function as guides when the tree is shifted along its own axis through the shear assembly.

I claim:

1. A tree harvester unit for mounting on a vehicle comprising a shear frame adapted for attachment in generally horizontal and transverse arrangement to a longitudinal axis of the vehicle, a fixed jaw secured to the shear frame and extending outwardly from the vehicle, a movable cutting blade pivoted to the shear frame and extending outwardly from the vehicle while in a retracted position to form an opening in combination with the jaw and a portion of the shear frame intermediate the jaw and movable blade for receiving a tree, the movable blade being pivotable toward the jaw and intermediate frame portion to secure the tree within the opening as it is being severed, motor means interconnected between the movable blade and shear frame, a fixed blade extending along the jaw and intermediate frame portion in facing relation to the movable blade to penetrate the tree as the tree is urged thereagainst by severing movement of the pivoted blade, the fixed blade being slightly offset to permit movement therepast of the pivoted blade, and guide means extending perpendicularly from the fixed blade to limit penetration of the fixed blade and facilitate movement of the severed tree relative to the fixed blade.

2. The tree harvester of claim 1 wherein the motor means is a hydraulic jack pivotally connected with the frame and the blade is spaced-apart relation from the pivotal connection of the blade with the frame.

3. The tree harvester of claim 1 wherein the fixed blade is arcuately formed with a cutting edge being defined by its arcuate surface in facing an offset relation to the movable blade.

4. The tree harvester of claim 3 wherein the guide means comprises a plurality of rails rigidly secured to the shear frame and arranged in spaced-apart relation along the arcuate fixed blade and behind the arcuate cutting edge to limit penetration of the cutting edge into the tree and to facilitate subsequent movement of the tree relative to the fixed blade.

5. The tree harvester of claim 4 wherein the shear frame is of box construction to enclose the motor means and to provide more rigid support for the arcuate fixed blade and guide rails.

6. The tree harvester of claim 5 wherein the shear frame includes a horizontal pivot means for connection with the vehicle to permit pivoting of the tree harvester unit between a generally horizontal plane and a generally vertical plane.

7. A tree harvester unit for mounting on a vehicle by means of a horizontal pivot connection, comprising a main frame adapted for parallel alignment with the trunk of a standing tree, a drive assembly arranged on the main frame and including means for gripping the tree and shifting it axially in relation to the harvester head, a delimbing assembly arranged on the main frame for removing limbs from the tree as the tree is shifted axially therepast by the drive assembly and a shear mechanism including a shear frame arranged perpendicularly on the main frame with a rear portion of the shear frame being secured to the main frame, a fixed jaw secured toward one lateral end of the shear frame and extending forwardly from the main frame, a movable cutting blade being pivotably mounted toward the rear of the shear frame and extending forwardly in a retracted position to form a forwardly facing opening together with the fixed jaw and a portion of the shear frame intermediate the jaw and movable blade for receiving a tree, the movable blade being pivotable by motor means toward the fixed jaw and intermediate frame portion as it is pivoted to sever the tree, a fixed blade extending along the jaw and intermediate frame portion in facing and slightly offset relation to the movable blade, the fixed blade penetrating the tree as the tree is urged thereagainst by severing movement of the movable blade, and guide means extending perpendicularly from the fixed blade to limit penetration of the fixed blade into the tree and facilitate axial movement of the tree past the fixed blade by the drive assembly.

8. The tree harvester of claim 7 wherein the motor means is a hydraulic jack pivotally connected with the frame and the blade in spaced-apart relation from the pivotal connection of the blade with the frame.

9. The tree harvester of claim 7 wherein the fixed blade is arcuately formed with a cutting edge being defined by its arcuate surface in facing an offset relation to the movable blade.

10. The tree harvester of claim 9 wherein the guide means comprises a plurality of rails rigidly secured to the shear frame and arranged in spaced-apart relation along the arcuate fixed blade and behind the arcuate cutting edge to limit penetration of the cutting edge into the tree and to facilitate subsequent movement of the tree relative to the fixed blade.

11. The tree harvester of claim 10 wherein the shear frame is of box construction to enclose the motor means and to provide more rigid support for the arcuate fixed blade and guide rails.

* * * * *